Aug. 16, 1949.                    L. G. CONNOR                    2,479,100
                              DOLLY-JACK FOR AIRPLANES

Filed June 22, 1945                                           5 Sheets-Sheet 1

FIG. I.

LIONEL G. CONNOR, Inventor

By Austin Middleton
                                                              Attorney Inventor
LIONEL G. CONNOR
By Arthur Middleton
Attorney

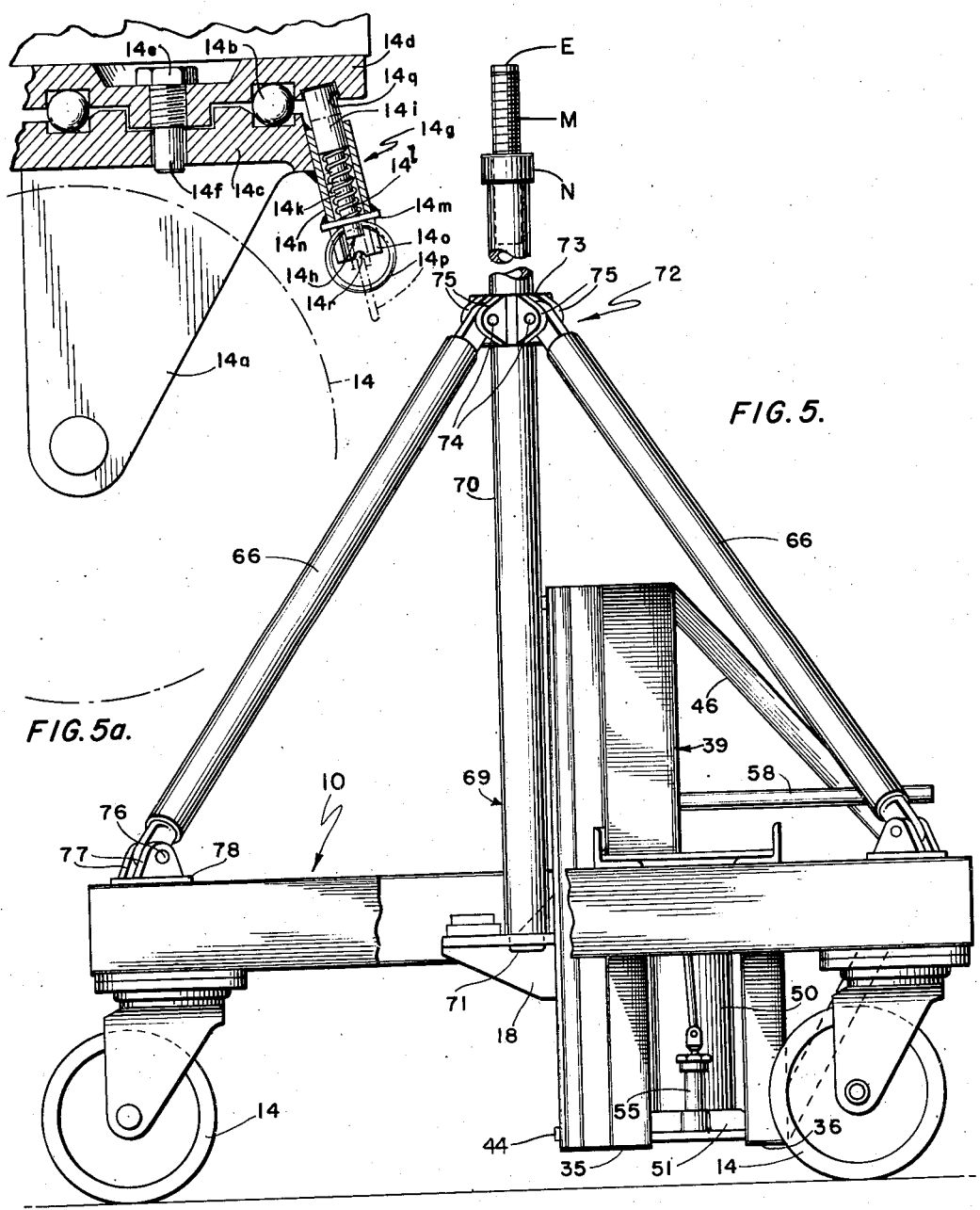

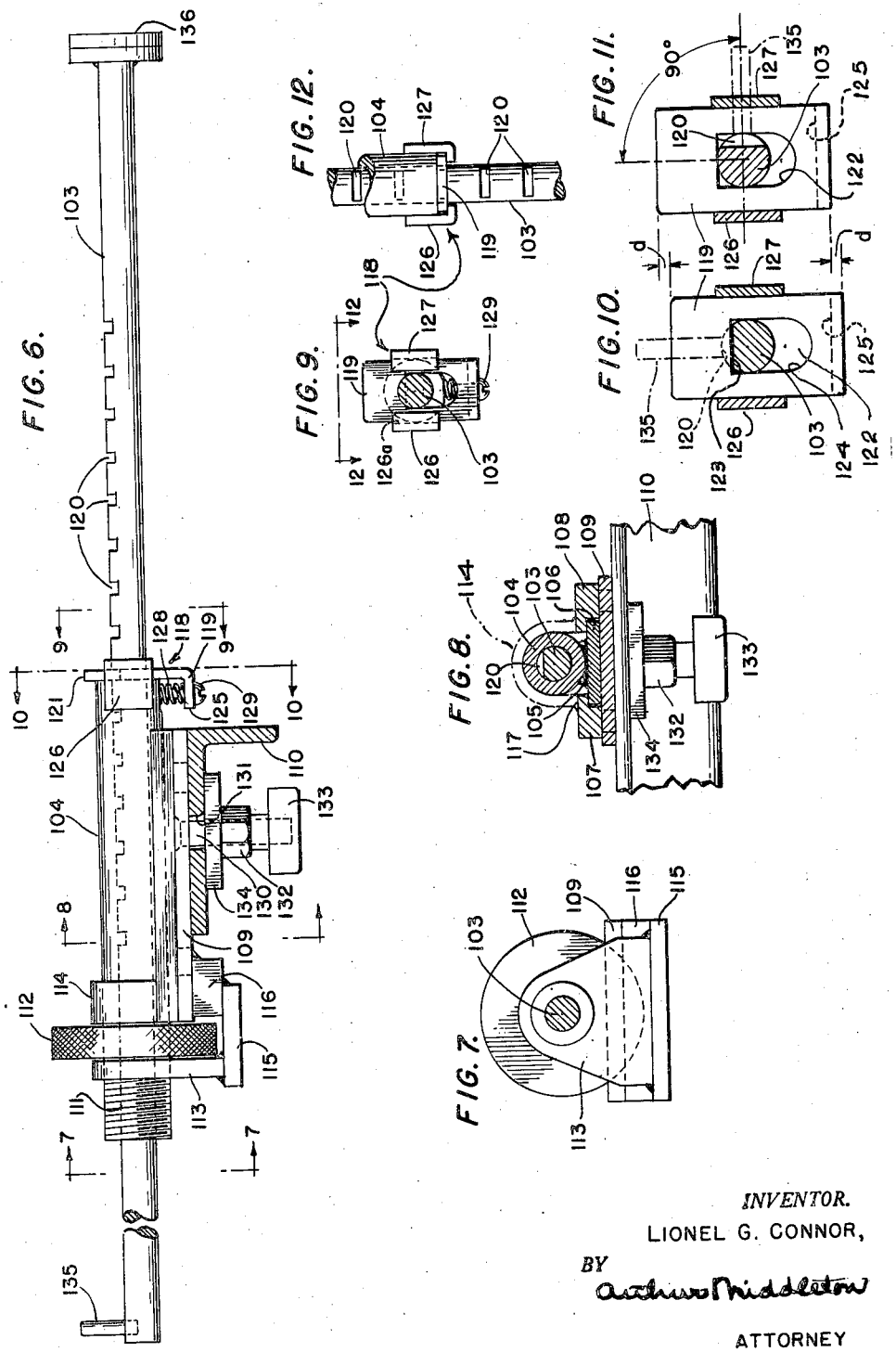

Patented Aug. 16, 1949

2,479,100

UNITED STATES PATENT OFFICE 2,479,100

DOLLY JACK FOR AIRPLANES

Lionel G. Connor, Washington, D. C., assignor to Connor Engineering and Manufacturing Company, Hyattsville, Md., a partnership Application June 22, 1945, Serial No. 601,002

9 Claims. (Cl. 254—2)

This invention relates to airplane ground-handling equipment, such as flat tire jacks, as well as dollies for moving a plane about the field.

One kind of aircraft flat tire jack may be applied directly at the wheel and will herein be called a wheel jack, while another kind may be applied under the wing of an airplane structure and will herein be called a wing jack, for raising a wheel from the ground. Dollies may serve to give emergency rolling support to a disabled plane as in a belly landing, or to enable a grounded plane to be moved about in a limited area with ease.

One object of this invention is to provide a piece of ground-handling equipment capable of serving a dual purpose, namely that of a flat tire jack and of a dolly or truck.

Other objects are to devise such a dual purpose piece of equipment that is structurally compact and rugged, as well as structurally and operationally efficient.

Another object is to devise such a dual purpose dolly that can be handled and adjusted with respect to the airplane expeditiously and easily.

Another object is to provide a jack or dolly capable of serving as wheel jack and also as a wing jack.

To this end the invention provides the combination of flat tire jack and dolly which comprises a horizontally extending U-shaped bed frame on casters, capable of being adjusted to an airplane wheel so as to substantially surround the same. Mounted upon the frame and disposed substantially within the space defined by the U-shape of the frame is a vertically slidable jacking lug adapted to engage the load by engaging the airplane structure at a point at or underneath the wheel bearing or strut. Hydraulic or mechanical jacking means are associated with the frame and with the lug to apply the power for raising the lug against its load.

According to one feature the jacking lug is capable of expeditious coarse adjustment prior to applying the load lifting power. In one embodiment of this feature the load lifting lug is adjustable by vertical intervals through its engagement upon respective rungs of a vertically slidable runged element, the spacing of the rungs representing the vertical intervals of adjustment.

Other features relate to devices associated with the dolly frame to permit easily controlled ground manoeuvering of the plane.

One such feature provides adjustable stabilizing devices mounted on the frame whereby the position of the dolly frame relative to the airplane wheel or wheel rim can be fixed. These devices will herein be called "strut rod adjusting devices."

Another such feature provides positioning devices for the casters whereby the casters can be fixed in predetermined angular positions, for instance in positions 90° apart.

Another feature provides an attachment or accessory equipment which permits converting the dolly from a wheel-jack to a wing-jack and vice versa. A wing-jack attachment comprises a vertical extension member which rests upon the jacking lug and is guided in its vertical movement by a bracing structure rising from the bed frame of the dolly.

The invention possesses other objects and features of advantage, some of which with the foregoing will be set forth in the following description. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Fig. 1 is a front view of the dolly-jack positioned about an airplane wheel, and provided with adjustable wheel rim struts;

Fig. 5 is a side view of the dolly with parts broken away for the showing of a wing-jack attachment; Fig. 5a is a detail of the caster swivel means with detent device therefor;

Figure 1:
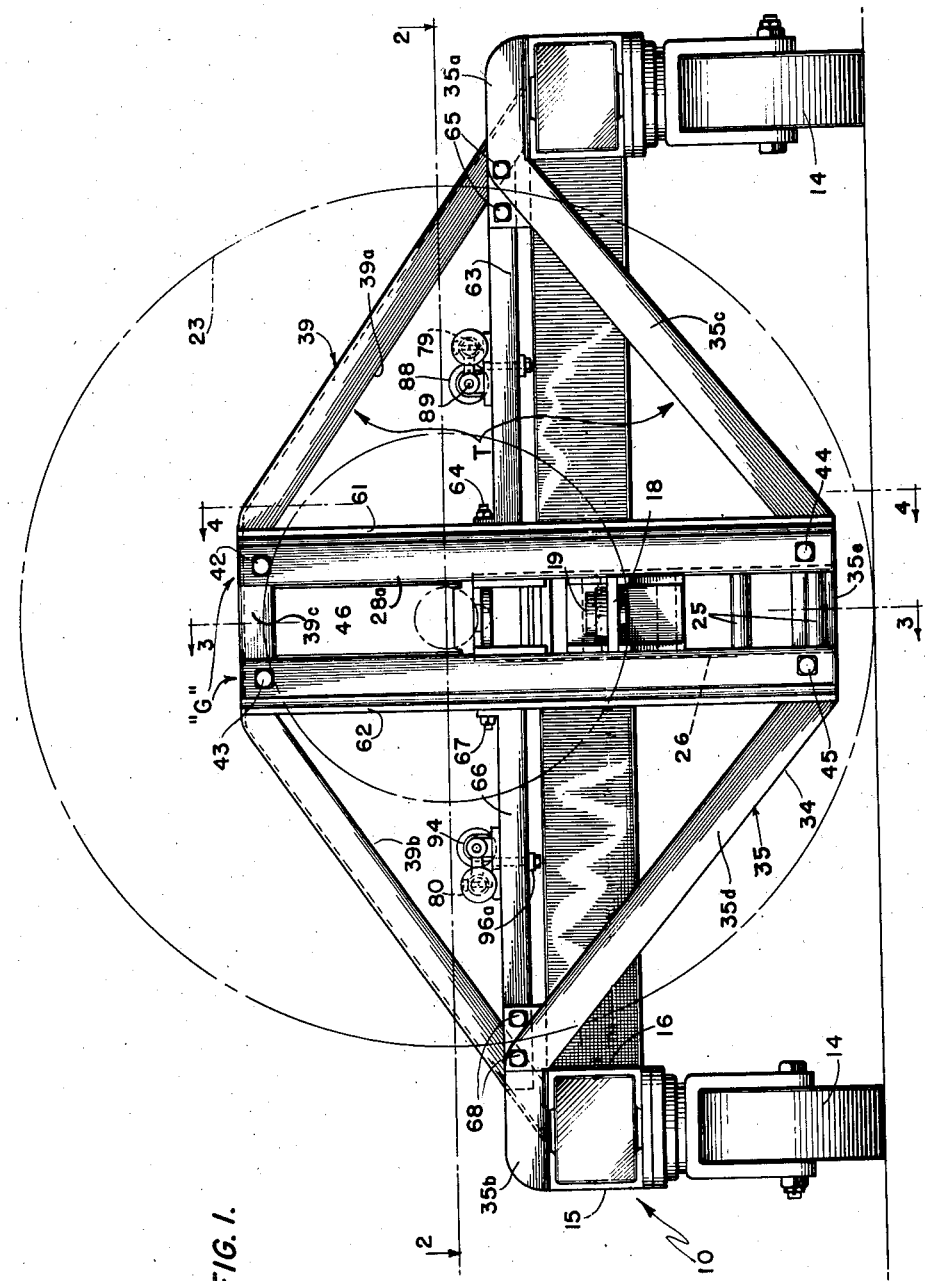
Figure 2:
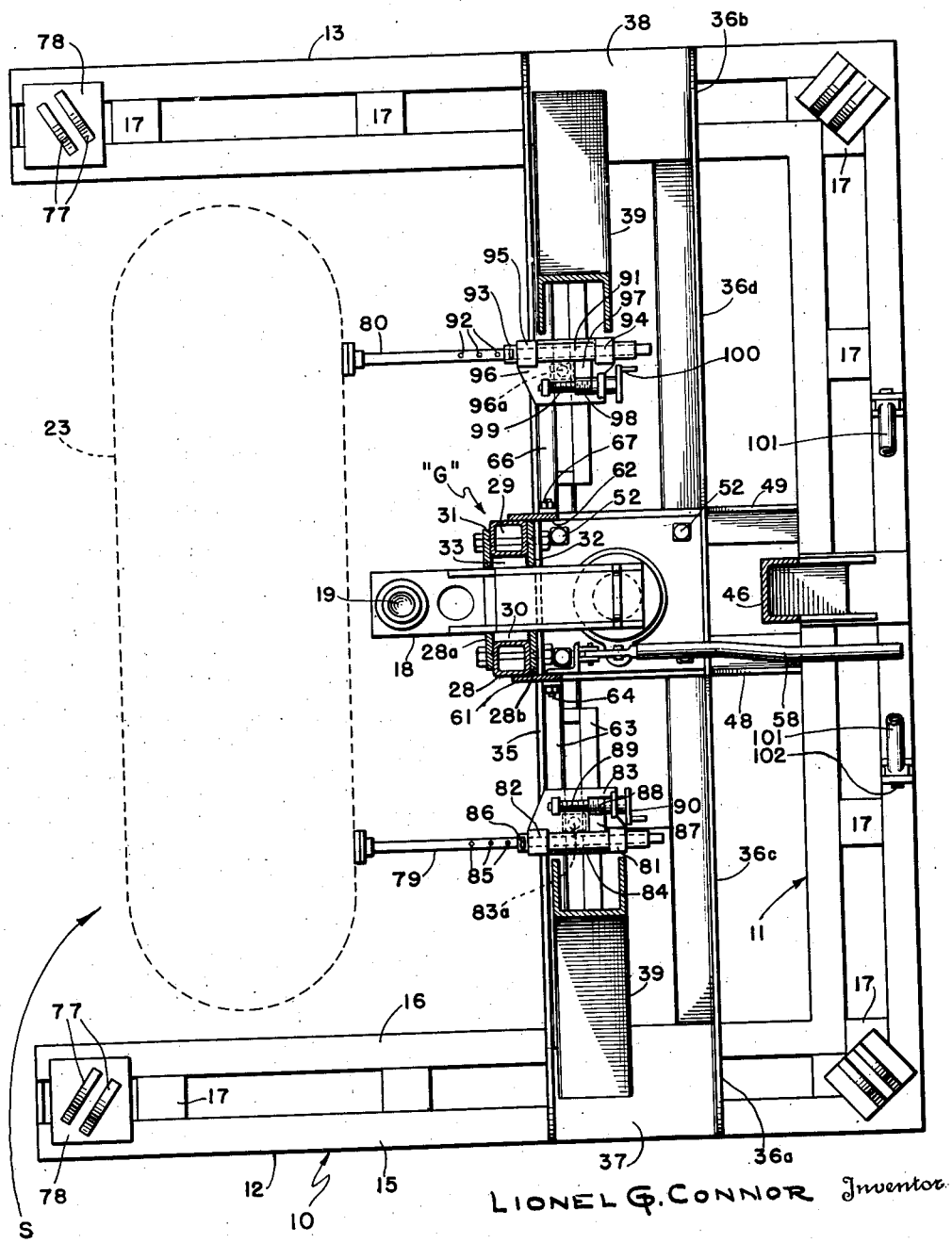
Fig. 2 is a part sectional plan view of the dolly taken on the line 2—2 in Fig. 1.

Figs. 6 to 12 show views of a structural embodiment of an adjustable strut for the airplane wheel rim, which differs from that shown in Figs. 1 and 2, Fig. 6 being a side view of the device, Fig. 7 being a cross-section along the line 7—7 of Fig. 6, Fig. 8 being a cross-section along the line 8—8 of Fig. 6, Fig. 9 being a cross-section along the line 9—9 of Fig. 6 showing certain details of a strut rod latching device, Figs. 10 and 11 showing the locked and unlocked positions of the latching device, and Fig. 12 being a partial plan view of the device taken upon Fig. 9.

The combination tire jack and dolly, or dolly-jack as it is herein briefly termed, comprises a bed frame 10 which in plan view appears as a U-shape consisting of the body portion 11 and the end portions or shanks 12 and 13 respectively of the U-shape, extending at right angles from the body portion 11. The bed frame 10 is shown to be supported by four casters 14, one at each corner of the frame. Positioning devices may be provided in conjunction with the casters, whereby the casters can be fixed in predetermined angular positions, for instance, 90° apart.

The U-shaped frame 10 is shown to be built up of structural steel shapes which are rigidly interconnected by suitable gusset plates or clips. The frame thus comprises an outer U-shaped portion 15 consisting of channel iron and an inner U-shaped portion 16 also of channel iron, both frame portions 15 and 16 being rigidly interconnected as by gusset plates 17. The U-shape of the frame defines between its shanks a space S within which it can accommodate an airplane wheel as well as the load-lifting mechanism therefor, which is mounted on the frame.

Figure 3:
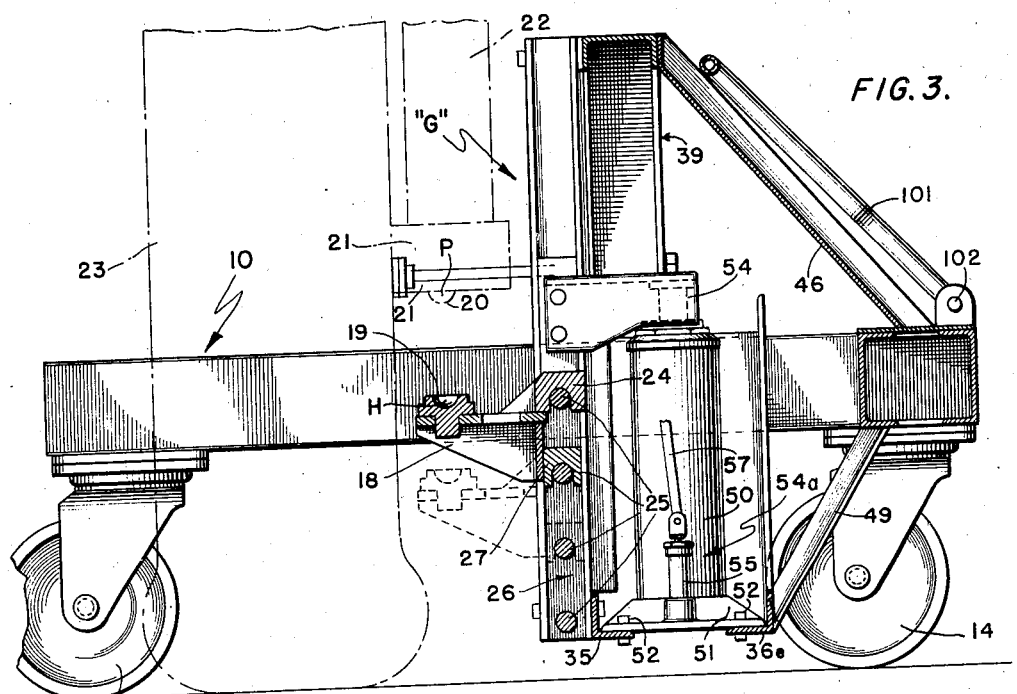
Fig. 3 is a section taken along the line 3—3 in Fig. 1.
Figure 4:
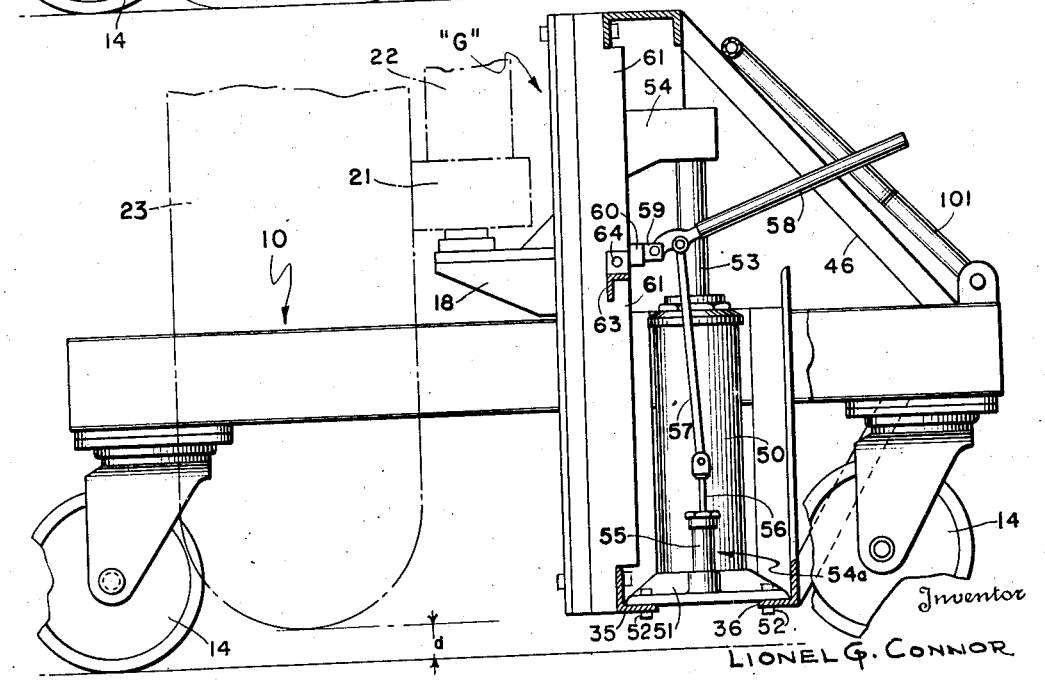
Fig. 4 is a section taken along the line 4—4 in Fig. 1.

The load-lifting mechanism comprises a jacking lug 18 having a cup-shaped load receiving portion 19 adapted for load engagement with a corresponding load contact point 20 underneath the bearing 21 which in turn forms part of the supporting strut 22 of an airplane wheel 23 in dot-and-dash (see Figs. 3 and 4). The load contact point of the wheel bearing is embodied in a semi-spherical portion P adapted to fit into a corresponding depression or hollow H in the load-receiving portion 19.

The jacking lug 18 is in the nature of a removable bracket having at its rear end a hook-shaped portion 24 adapted to engage over and upon one of the rungs 25 of a vertically slidable runged member 26. Underneath the hook-shaped portion 24 the jacking lug 18 has a bracing portion 27 here also shown to be in the form of a hook similar to hook-shaped portion 24 and adapted to engage the next lower rung 25. The runged or ladder-shaped member 26 is vertically slidable in a guide structure G shown to comprise a pair of vertical posts 28 and 29 of square hollow cross-section. The post 28 has welded to it at the front a flat iron 28a and at the rear a flat iron 28b in such a manner as to form a vertical guide groove for the upright 30 of the runged member 26. Correspondingly, the post 29 has welded to it at the front a flat iron 31 and at the rear a flat iron 32 in such a manner as to form a vertical guide groove for the other upright 33 of the runged member 26.

The vertical guide structure G is supported by and fastened to a truss construction T fixed upon the bed frame 10 and extending across the space S and from one shank of the bed frame 10 to the other. This truss construction comprises a lower chord or cradle-shaped truss portion 34 which comprises a pair of cradle shaped angle irons 35 and 36. The angle iron 35 has a pair of horizontal end portions 35a and 35b whereby it is supported upon and fastened to the bed frame 10, a pair of diagonal portions 35c and 35d, and a horizontally extending central or bottom portion 35e. The angle iron 36 similarly comprises a pair of end portions 36a and 36b, a pair of diagonal portions 36c and 36d and a horizontally extending or bottom portion 36e. The ends of the angle irons 35 and 36 are interconnected by gusset plates 37 and 38 respectively. An upper chord of this truss construction T comprises a channel iron 39 consisting of a pair of diagonal end portions 39a and 39b and a horizontally extending central or top portion 39c. The ends of the upper chord or channel iron 39 are shown to be welded to gusset plates 37 and 38 respectively.

The vertical guide structure G is fastened laterally to the truss construction T as is indicated by a pair of upper bolts 42 and 43 connecting the upper ends of the vertical guides with the top portion 39c of the upper chord 39, and by a pair of lower bolts 44 and 45 connecting the lower ends of the vertical guides with the bottom portion 35e of the lower chord 35.

Additional stiffening for the truss construction T is provided by an upper diagonal rearward bracing member 46 extending between the upper chord 39 and the body portion 11 of the frame 10, and further by a pair of lower diagonal rearward bracing members 48 and 49 extending between the lower chord 34 and the body portion 11 of the frame 10.

Associated with the jacking lug 18 and with the vertically slidable runged member 26 is a vertical hydraulic actuating cylinder 50 having a base 51 whereby the cylinder is fixed to the central or bottom portion of the lower chord 34 as by means of bolts 52. Movable in and coaxially with the cylinder 50 is a plunger stem 53 the free upper end of which engages an arm or bracket 54 fixed to the upper end portion of the runged member 26. A pump to supply hydraulic pressure fluid to the cylinder 50 is shown at 54a comprising a small pump cylinder 55, a plunger 56, a plunger connecting rod 57 pivotally connected at one end with the plunger 56 and at the other end with an actuating hand lever 58 fulcrumed as at 59 upon a bracket 60 fastened to the vertical guide structure G by means of a vertical flat iron 61 welded to the vertical guide post 28. A similar vertical flat iron 62 is welded to the other guide post 29.

A horizontal brace 63 extends from the vertical flat iron 61 of the guide structure outwardly and is connected at its inner end to the flat iron 61 as by bolt 64, and at its outer end is connected to the horizontal end portion 35a of the cradle-shaped angle iron 35 of the lower truss chord as by means of bolts 65. Similarly an opposite horizontal brace 66 has its inner end fixed to the vertical flat iron 62 as by a bolt 67, and has its outer end fixed to the other horizontally extending end portion 35b of the cradle-shaped angle iron 35 as by means of bolts 68.

A pair of horizontally slidable struts or strut rods 79 and 80 are adapted to engage the rim of an airplane wheel 23 (as indicated in Fig. 2) so as to stabilize the position of the dolly frame 10 with respect to the vertical plane defined by the rim of the airplane wheel. In order to provide for universal adjustability of the struts 79 and 80 in a horizontal plane to suit a variety of kinds and sizes of airplane wheels, each strut 79 and 80 is mounted adjustably upon a bracket which itself is adjustable upon the dolly frame 10. Hence, the strut 79 is horizontally slidable in a pair of bearings 81 and 82 which are fixed upon a bracket 83 which in turn is laterally adjustable by way of suitable clamping means 83a whereby it is fastened to the horizontal brace 63. More in detail, the strut 79 is mounted in a sleeve member 84 in which it is axially roughly adjustable in a manner indicated by holes 85 and a pin 86. The sleeve member 84 in turn is slidably adjustable in the two bearings 81 and 82, the sleeve member 84 having a lateral lug 87 comprising a nut 88 engaging upon and controlled by a screw spindle 89 which extends parallel to the strut 79 and is rotatably mounted upon the bracket 83 and turnable by hand crank 90. Similarly, the strut 80 is mounted in a sleeve 91 in which it is axially roughly adjustable as indicated by holes 92 and pin 93. The sleeve 91 in turn is axially adjustable in two bearings 94 and 95 provided on a bracket 96 which in turn is adjustable laterally as by way of suitable clamping means 96a whereby it is fastened to the horizontal brace 65. The sleeve 91 has a lateral lug 97 comprising a nut 98 engaging upon and controlled by a screw spindle 99 extending parallel to the strut 80 and turnable by a hand crank 100. A tongue or handle 101 is hinged at 102 to the body portion 11 of the frame 10, for pulling and maneuvering the dolly.

The combined wheel jack and dolly so far described is of low slung construction capable of attacking the load at the airplane wheel itself, that is at a point relatively close to the ground. An attachment is provided (see Figs. 2 and 5) for rendering this dolly capable of supporting a more elevated load point of an airplane structure, for instance as is required of a wing-jack. That attachment is shown to comprise a vertical jack extension member 69 in the form of a tube 70 having a foot portion 71 adapted to rest upon the jacking lug 18 and guided for vertical movement in a four-legged guide structure 72 comprising a central guiding bushing or annulus 73 surrounding and guiding the vertical extension member 69, and diagonal legs 66, only two of which are visible in Fig. 5 although four of them are provided, each leg extending to its respective corner of the frame 10. Each leg 66 is connected at its upper end to the annulus 73 by means of a pin 74 and a pair of eyes 75 forming part of the annulus 73. The lower end of each leg 66 is connected to a respective corner or end portion of the frame 10 by means of a pin 76 and a pair of eyes 77 forming part of a bracket 78 fastened to the frame 10.

With suitable locking devices provided for the casters 14, the dolly can be made more governable under certain operating conditions. When the dolly is used in towing a plane, the trailing casters could be locked in that position which would assure tracking of the plane along the desired towing line, whereas without a locking feature with full swiveling casters there is a tendency to stray off from side to side following the line of least resistance. Since the dolly may be used for towing a plane laterally, locking of the casters in a corresponding position provides for this condition also.

Fig. 5a shows an enlarged detail of the caster 14 mounted in a caster swivel bracket 14a supporting the dolly frame through a thrust ball bearing comprising balls 14b, a lower rotatable bearing plate 14c forming part of the swivel bracket 14a, and an upper stationary ball bearing plate 14d unitary with or fixed to the dolly frame. A bolt 14e is screwed into the center of the upper bearing plate and has a cylindrical non-threaded end portion 14f lodging in a central opening of the rotary bearing plate to prevent dislocation of the ball bearing. A locking device 14g for locking the swivel bracket relative to the dolly frame, comprises a latch member 14h having a cylindrical or plunger portion 14i and a reduced or stem portion 14k, a coil spring 14l, surrounding the stem portion and confined between the portion 14i and a closure plate 14m forming part of a cylindrical housing portion 14n the free end of which has a slotted portion 14o in which lodges a pull ring 14p attached to the stem portion 14k, while the latch member engages a recess 14q provided in the upper stationary bearing plate 14d thereby locking the swivel bracket. A number of such recesses 14q may be provided spaced along the circumference of the stationary bearing plate 14d, so the swivel bracket can be locked in positions corresponding to such recesses. In order to unlock the swivel member, the latch member 14h is pulled downwardly by the pull ring 14p and then turned a quarter turn so the pull ring will engage in detent notches 14r of the housing portion 14n.

Figs. 6 to 7 represent detailed views and sections of an embodiment of an adjustable rim strut device differing from that shown in Figs. 1 and 2 such as covered, for instance, by the references 91 to 100.

This modification of the strut rod device comprises a horizontal strut rod 103 axially movable and adjustable in a tubular member or sleeve 104 welded as at 105 to a horizontal plate 106 horizontally slidable between guide members 107 and 108 fixed to a base plate 109 which in turn is fixed, although laterally adjustable, upon a horizontal brace 110 of the dolly frame, which brace member 110 may be said to correspond to the brace member designated by numeral 63 in Fig. 2. The one end of the tubular member 104 is threaded as at 111 and has applied to it a knurled nut 112. The nut 112 is confined between thrust members 113 and 114 which are unitary with the base plate 109. The thrust member 113 is shown to be fixed to the base plate 109 by way of welded portions 115 and 116, while the thrust member 114 is shown to be welded as at 117 to the guide members 107 and 108. Hence, by rotating the knurled nut 112, the tubular member 104 can be axially moved and with it the strut rod 103 locked to the tubular member 104 by a latch device 118.

The latch device 118 comprises a latch plate or latch member 119 surrounding the strut rod 103 and adapted to engage in any of a series of notches 120 provided upon the strut rod 103. The latch plate 119 comprises a vertical flat body portion 121 provided with an opening 122 of U-shaped contour which contour comprises a horizontal straight edge portion 123 at the top and a concavely curved edge portion 124 at the bottom. From the body portion 121 of the latch plate there extends rearwardly and at right angles a horizontal portion 125. The latch member 119 is shiftable upwardly and downwardly between guide members 126 and 127 shown to be welded as at 126a to the unthreaded end portion of the tubular member 104. Normally the latch member 119 is urged into strut rod locking position when the straight edge portion 123 engages in one of the notches 120 of the strut rod by a coil spring 128 lodged between the horizontal portion 125 of the latch member and the adjacent flattened portion of the underside of the tubular member 104. The spring 128 is held in place by being coiled around the free end portion of a retaining screw 129 threaded upside down into the horizontal portion 125 of the latch member.

The adjustable strut rod unit as shown in Fig. 6 is bodily adjustable sideways by reason of a bolt 130 fixed to the base plate 109 and extending downwardly from the underside thereof through a slit 131 provided in the horizontal brace member 110. The device is held in a bodily adjusted position on the brace member 110 when a nut 132 having a finger piece or handle portion 133 is tightened upon the bolt 130, a washer member 134 being interposed between the nut 132 and the underside of the brace member 110.

In the operation of this strut rod adjusting device (Figs. 6 to 11) a rough axial adjustment of the strut rod 103 relative to the rim of an airplane wheel can be effected by turning the locked rod through an angle of say 90° so that a pin or finger piece 135 provided upon the free end of the strut rod 103 is swung from its vertical position to a horizontal position as indicated in dot-and-dash lines in Figs. 10 and 11. This quarter turn forces the latch member 119 from its (Fig. 10) rod locking position to the Fig. 11 rod releasing position by lifting it through the distance d. The rod 103 can now be freely shifted axially within the tubular member 119 into position roughly adjusted relative to the rim of an airplane wheel, that is to a position where one of the notches 120 will register with the latch member 119, when the rod may again be turned back a quarter turn to allow the latch member 119 to be spring-urged into the notch, thereby locking the rod 103 in a roughly adjusted position. Then by turning the knurled nut 112 the tubular member 104 can be axially shifted between its guides 107 and 108 to establish the desired contact between the front end 136 of the rod 103 and the rim of the airplane wheel.

Operation

In case one of the airplane wheels 23 has a flat tire such as indicated in Fig. 3, the dolly is rolled into the Figs. 2 and 3 position and is adjusted with respect to the wheel 23 so that the dolly frame 10 will symmetrically surround the wheel but will have spaced relationship with respect to the body portion 11 of the frame as determined by the adjustment of the struts 79 and 80 whereby the lifting lug 18 will be properly positioned underneath the wheel bearing 21, that is for engagement with the supporting point P thereof. In Fig. 3 the lifting lug 18 is shown to be attached to the topmost rung 25 of the ladder-like member 26, while the hydraulic plunger stem 53 is shown in its lower or retracted position.

By working the pump handle 58 up and down the pump 54a is caused to supply pressure fluid to the hydraulic operating cylinder 50, thus forcing the plunger stem 53 upwardly to its extended (Fig. 4) position. This raises the lifting lug 18 until it engages the wheel bearing 21 and further until the wheel 23 will have been raised a sufficient distance d from the ground. With the wheel 23 being properly braced off with respect to the dolly frame 10 through the struts 79 and 80, the airplane can then be manoeuvered about as the dolly in some respects takes over the function of the wheel 23. Depending upon the manner in which it is desired to manoeuver the airplane the casters 14 of the dolly may be fixed in a predetermined or desired position by a suitable positioning device, or else they may be allowed to swivel freely. After the tire of the wheel 23 has been repaired or replaced, or if need be after the entire wheel has been exchanged, the lifting lug 18 can be lowered and the dolly withdrawn from its co-operable relationship with the wheel strut 22.

The alternative function of the dolly as a wing jack for airplanes is substantially self-explanatory from Fig. 5. That is to say, the dolly frame 10 is provided with corner brackets 78 (shown in Figs. 2 and 5 but not shown in Figs. 3 and 4) by means of which the four-legged guide or auxiliary structure 72 can be mounted upon the dolly frame 10. The jack extension member 69 is then inserted into the guide structure 72, that is into the upper annular portion 73 thereof, the foot portion 71 of the extension member 69 engaging or resting upon the lifting lug 18 of the jack device of the dolly. Thus there is established an elevated jacking point at the top end E of the extension member 69, adapted to engage a suitable point at the underside of the wing structure of an airplane. A screw member M provided with a nut N is inserted into the top end of tube 70 of extension member 69 to provide a further adjustment possibility in that the supporting or jacking point can be varied by screwing the nut member N up or down on the screw member M.

I claim:

1. A dolly jack comprising a horizontally extending caster-supported frame presenting substantially a U-shape in plan view and having a body portion and a pair of shank portions extending therefrom, a truss-structure rigidly extending between the shanks of and across the space defined by said U-shape of the frame and spaced a horizontal distance from the free ends of said shanks as well as from the body portion of said frame, said truss-structure having a lower chord and an upper chord, a pair of vertical guide track members having their lower ends fastened to the middle portion of said lower chord and their upper ends fastened to the middle portion of said upper chord, a vertical slide element vertically movable between and guided by said track members, a first lug member extending from the front of said slide element facing the open end of said frame and adapted to receive a load to be raised or lowered by the vertical movement of said slide element, a second lug extending from the rear of said slide element in a direction opposite to said first lug, power-lifting means disposed at the rear of said slide element and said track members and engaging said second lug and adapted to be expanded or contracted for raising or lowering said slide element, and a base disposed at the foot and rearwardly of said track members and rigidly associated with said frame and said track members for receiving vertical load thrust reaction of said power-lifting means.

2. A dolly jack according to claim 1, in which the lower chord extends to a point below and the upper chord extends to a point above said frame.

3. A dolly jack according to claim 1, in which the lower chord extends to a point below and the upper chord extends to a point above said frame, with the addition of an inclined bracing member rigidly connecting said base with the body portion of said frame.

4. A dolly jack according to claim 1, in which the lower chord extends to a point below and the upper chord extends to a point above said frame, with the addition of an inclined upper bracing member rigidly connecting the middle portion of the upper chord with the body portion of said frame, and an inclined lower bracing member rigidly connecting said base with said body portions of the frame.

5. A dolly jack according to claim 1, in which said power-lifting means comprise an upright hydraulic power cylinder mounted on said base and having a piston rod engaging said second lug.

6. A dolly jack according to claim 1, in which the lower chord extends to a point below and the upper chord extends to a point above said frame, with the addition of a first horizontal bracing member rigidly connecting the one track member with the corresponding end of the truss structure, and a second horizontal bracing member connecting the other track member with its adjacent end of the truss structure.

7. A dolly jack according to claim 1, in which said slide element comprises rungs, and said first lug member is selectively positionable upon said rungs.

8. A dolly jack according to claim 1, in which said first lug is vertically adjustable upon said slide element.

9. A dolly jack according to claim 1, in which the lower chord extends to a point below and the upper chord extends to a point above said frame, with the addition of a first horizontal bracing member rigidly connecting the one track member with the corresponding end of the truss structure, and a second horizontal bracing member connecting the other track, a stabilizing device mounted upon each horizontal bracing member, each stabilizing device comprising a horizontal strut rod extending toward the open end of said frame and substantially at right angles to the plane of the wheel, means for axially adjusting said rod, and means for laterally adjusting said rod.

LIONEL G. CONNOR.

REFERENCES CITED

The following references are of record in the file of this patent:

UNITED STATES PATENTS

| Number | Name | Date |
|---|---|---|
| 1,364,175 | Bjornlie | Jan. 4, 1921 |
| 1,416,958 | Kelly et al. | May 23, 1923 |
| 1,523,486 | Manley | Jan. 20, 1925 |
| 1,555,152 | Passow | Sept. 29, 1925 |
| 1,964,119 | Hendry | June 26, 1934 |
| 2,314,589 | Mandl | Mar. 23, 1943 |
| 2,326,684 | Ross | Aug. 10, 1943 |
| 2,377,404 | Cullers | June 5, 1945 |
| 2,388,692 | House | Nov. 13, 1945 |

FOREIGN PATENTS

| Number | Country | Date |
|---|---|---|
| 792,480 | France | Dec. 31, 1935 |